US008751457B2

(12) United States Patent
Grigg et al.

(10) Patent No.: US 8,751,457 B2
(45) Date of Patent: Jun. 10, 2014

(54) MOBILE DEVICE DATA ARCHIVING

(75) Inventors: David M. Grigg, Rock Hill, SC (US);
John Franklin Tuders, Harrisburg, NC (US); Peter John Bertanzetti, Charlotte, NC (US); Tony England, Tega Cay, SC (US)

(73) Assignee: Bank of America Corporation, Charlotte, NC (US)

( * ) Notice: Subject to any disclaimer, the term of this patent is extended or adjusted under 35 U.S.C. 154(b) by 34 days.

(21) Appl. No.: 13/342,079

(22) Filed: Jan. 1, 2012

(65) Prior Publication Data

US 2013/0173556 A1  Jul. 4, 2013

(51) Int. Cl.
*G06F 7/00* (2006.01)
*G06F 17/00* (2006.01)

(52) U.S. Cl.
USPC ........... 707/667; 707/669; 707/791; 707/640; 707/654

(58) Field of Classification Search
CPC ............ G06F 11/1451; G06F 11/1469; G06F 11/1458; G06F 11/1456; G06F 11/1461; H04M 1/72547; Y10S 707/99955
USPC .......................................................... 707/667
See application file for complete search history.

(56) References Cited

U.S. PATENT DOCUMENTS

| 7,334,157 | B1* | 2/2008 | Graf et al. ........................ 714/13 |
| 7,729,690 | B1* | 6/2010 | Huang et al. .................. 455/419 |
| 8,359,016 | B2* | 1/2013 | Lindeman et al. ......... 455/414.1 |
| 2003/0120951 | A1* | 6/2003 | Gartside et al. ............... 713/201 |
| 2005/0097132 | A1* | 5/2005 | Cochran et al. ............ 707/104.1 |
| 2005/0102329 | A1* | 5/2005 | Jiang et al. ..................... 707/204 |
| 2005/0216618 | A1* | 9/2005 | Owens et al. ................... 710/60 |
| 2005/0289195 | A1* | 12/2005 | Lehtola et al. ................ 707/204 |
| 2006/0242273 | A1* | 10/2006 | Fiducci ......................... 709/220 |
| 2008/0263064 | A1* | 10/2008 | Choi ............................. 707/100 |
| 2008/0307175 | A1* | 12/2008 | Hart et al. ..................... 711/162 |
| 2008/0310633 | A1* | 12/2008 | Brown et al. .................. 380/259 |
| 2009/0300119 | A1* | 12/2009 | Nguyen ........................ 709/206 |
| 2010/0149339 | A1* | 6/2010 | Wagner et al. ............... 348/164 |
| 2010/0241618 | A1* | 9/2010 | Beatty et al. .................. 707/679 |
| 2011/0016089 | A1* | 1/2011 | Freedman et al. ........... 707/640 |
| 2011/0029750 | A1* | 2/2011 | Jang et al. ..................... 711/162 |
| 2011/0047597 | A1* | 2/2011 | Mahaffey et al. ................ 726/3 |
| 2011/0218965 | A1* | 9/2011 | Lee et al. ...................... 707/640 |
| 2012/0149339 | A1* | 6/2012 | Mulampaka et al. ...... 455/412.1 |
| 2013/0080348 | A1* | 3/2013 | Pantaliano et al. ........... 705/347 |

OTHER PUBLICATIONS

Verizon, How to Use Guide: Backup Assistant, Nov. 28, 2011.*

* cited by examiner

*Primary Examiner* — Binh V Ho
(74) *Attorney, Agent, or Firm* — Michael A. Springs; Moore & Van Allen PLLC; Nicholas C. Russell

(57) ABSTRACT

Mobile devices such as cell phones, "smart" phones, personal data assistants (PDA's) and the like are equipped for accessing and storing all types of media, including movies, music, software applications, as well as copious amounts of associated data. Accordingly, a need exists for methods, apparatuses and computer program products that assist mobile device users in archiving data, configuring the data, and restoring the data to the same device, or a new mobile device running the same or different operating system. Embodiments of the claimed invention address the above needs and/or achieve other advantages by providing systems for archiving data on a mobile electronic device on a plurality of data storage media, and by providing similar means of restoring the archived data to the same or different mobile device.

45 Claims, 4 Drawing Sheets

MOBILE DEVICE DATA ARCHIVING

FIELD OF THE INVENTION

The present invention relates to mobile electronic computing devices and networks, and more particularly to a system and method to periodically archive device data to local or remotely connected storage media.

BACKGROUND

Mobile electronic devices are now commonly used for multiple computing functions in addition to telecommunications. Mobile devices such as cell phones, "smart" phones, personal data assistants (PDA's) and the like are equipped for accessing and storing all types of media, including movies, music, software applications, as well as copious amounts of associated data. As mobile devices are increasingly integrated into the daily life of the typical user, the loss of the device due to misappropriation, or any other type of unintentional loss can cause a great deal of inconvenience, loss of time and productivity, and at times cause the permanent loss of irreplaceable data such as photographs, notes, and the like. Some mobile device users possess a limited level of technical savvy, and therefore prefer or require a simple, easy to use interface in which data can be archived and restored in a few simple steps. Other technically sophisticated users desire precise control over what data is archived, where the data is archived, and how often backups should be scheduled. Additionally, when mobile electronic devices are replaced, they are often replaced with a different model, which may run a dissimilar operating system from the device being replaced. Accordingly, a need exists for methods, apparatuses and computer program products that assist mobile device users in archiving data, configuring the data, and restoring the data to a new mobile device running the same or different operating system.

Storage media has transcended the magnetic disks of the past and now includes numerous methods of secondary storage, such as internal hard disks on a personal computer, SD cards, external disk drives, remote computer storage and cloud storage using the internet or other networks. The data storage capacity of mobile devices increases with every iteration of new products. A need is therefore created for data archiving that can accommodate the large volumes of data, and archiving that provides flexible use of a variety of media.

BRIEF SUMMARY

A need exists for methods and apparatuses that allow users of mobile electronic devices to periodically back up mobile device data to local or remote data storage media using either a "one click" user interface, or a sophisticated user interface that allows detailed control over archiving functions. Furthermore, a need exists for intentional "one time" backups for mobile devices, as well as regular and periodic backups that run automatically without further user intervention. Similarly, restore functions are needed that provide varying levels of control for data restoration.

In general, embodiments of the claimed invention address the above needs and/or achieve other advantages by providing apparatuses (e.g., a system, computer program product and/or other devices) and methods for archiving data on a mobile electronic device on a plurality of data storage media, and by providing similar means of restoring the archived data to the same or different mobile device.

The following presents a simplified summary of the disclosure in order to provide a basic understanding of some aspects of the invention. This summary is not an extensive or exhaustive overview of the invention. It is not intended to identify key or critical elements of the invention or to delineate the scope of the invention. The following summary merely presents some concepts of the invention in a simplified form as a prelude to the more detailed description provided below.

Embodiments of the invention are generally directed to methods and apparatuses for archiving data residing on an electronic mobile device (i.e. mobile phone, smartphone, personal data assistant (PDA), handheld computer, IPod®, IPad®, handheld device, pocket PC, etc.). Methods and apparatuses are provided for restoring the archived data to the same mobile device, or a mobile device dissimilar from the device in which the data was archived. Computer-executable code used on the mobile device provides simple and intuitive means for a user to both archive and restore resident data. The application provides "one click" backups, as well as a customizable interface. The interface provides a user with precise control over which data, device settings, multimedia, applications, applications data, general data, etc. will be archived. Restoration of archived data is accomplished by at least two ways: (1) By executing the code on the mobile device and (2) by executing the code remotely from a host device such as a personal computer operatively connected through a network such as the internet.

Archiving the resident data on a mobile device includes storing, along with the archived data, computer-executable code that restores the data to a device operatively connected to the storage media. When executed, the code provides a written message to the user indicating steps for the user to accomplish to complete the restoration, in addition to the steps automatically accomplished by the archiving system. The computer executable code works by executing the code on the restored mobile device or on a host device which is operatively connected to the restored device.

Restoration of archived device data, applications and settings that formerly resided on the same mobile device does not require reconfiguration. However, if the operating system of the new device on which the restored data will be transferred is different or incompatible with the operating system of the archiving device, some or all of the transferred (restored) data is configured for compatibility with the new device. In such an embodiment, the operating system of both the archiving mobile device and the new device is detected and compared. In cases of incompatibility, restoration data is automatically reconfigured for use with the receiving operating system.

The claimed invention is generally described in two main functions: archiving (backing up, saving, etc.) and restoring (saving from the archive media back to the mobile device). Embodiments of the claimed invention provide a method for archiving information residing on a mobile device of a user, the method comprising: (a) identifying, using a processing device, a storage medium external to the mobile device for archiving information residing on the mobile device; (b) identifying, using a processing device, information residing on the mobile device; (c) selecting some or all the identified information to archive; (d) archiving the selected information and instructions for storing the selected information to the identified storage medium by transmitting the information and instructions; and (e) recording, on the mobile device, first computer-executable program code configured to, when executed, restore the archived information from the storage medium to the mobile device.

The restoration function generally works by (a) executing the program code on the mobile device to restore the archived information from the storage medium to the mobile device in response to receiving user input; and (b) receiving a transmission comprising some or all the archived information. Restoring the archived information from the storage medium further comprises restoring a plurality of information comprising any one or more of applications, programs, application data, music, movies, videos, user settings, and user preferences.

According to some embodiments, a first and second program code are provided for retrieving the archived data, where the first program code resides on the mobile device and is executable from the mobile device. Also provided according to embodiments is a method for archiving, on a storage medium, second computer-executable program code configured to, when executed, restore the archived information from the storage medium to the mobile device. The second program code is executable from a remote location using a "host" device. According to some embodiments, the first computer-executable program code is identical to the second computer-executable program code.

In a further embodiment of the invention, identifying the storage medium external to the mobile device comprises communicating a request for user input indicating which of a plurality of storage media external to the mobile device should receive the identified information for archiving.

In accordance with yet another embodiment, identifying the storage medium external to the mobile device comprises receiving user input indicating which of a plurality of storage media external to the mobile device should receive the identified information for archiving.

Identifying the storage medium external to the mobile device for archiving information comprises, according to some embodiments, determining two or more storage media external to the mobile device for archiving information, the two or more storage media capable of being operatively connected with the mobile device and configured to receive information for archiving.

In yet other embodiments, identifying the storage medium external to the mobile device for archiving information comprises determining one or more storage media external to the mobile device for archiving information operatively connected with the mobile device and configured to receive information for archiving.

Accordingly, in yet other embodiments, identifying the storage medium external to the mobile device for archiving information comprises recognizing that one or more storage media have been operatively connected with the mobile device and determining that the one or more storage media for archiving information are capable of receiving information for archiving.

In still yet other embodiments, identifying the storage medium external to the mobile device for archiving information further comprises selecting one of the two or more storage media based at least in part on one or more media archiving preferences.

In accordance with embodiments, the one or more media archiving preferences comprise one or more user-selected preferences comprising a hierarchy of available storage media for archiving information.

Accordingly, in yet other embodiments, identifying the storage medium external to the mobile device for archiving information further comprises: (1) communicating a prompt to the user requesting a hierarchy of available storage media; and (2) receiving user input comprising the hierarchy of available storage media.

Accordingly, as in some embodiments, the media archiving preferences comprise an available capacity preference indicating that the storage media should be selected based on the greatest available storage capacity among the two or more storage media.

In still yet other embodiments, the media archiving preferences comprise an available data transfer rate preference indicating that the storage media should be selected based on the greatest available data transfer rate among the two or more storage media.

In further accord with an embodiment of the claimed invention, the storage medium external to the mobile device comprises one or more of a smartphone, a telephone, a personal digital assistant, an SD card, a micro-SD card, a USB device, an external disk drive, an internal disk drive, one or more remote computers, one or more remote servers, one or more remote databases.

In accord with yet another embodiment of the claimed invention, the media archiving preferences comprise a user-defined criteria for selecting the storage medium external to the mobile device for archiving information.

Furthermore, in accord with an embodiment of the claimed invention, identifying information residing on the mobile device further comprises information that identifies the operating system of the mobile device.

The identified information to archive, according to an embodiment of the claimed invention, further comprises information that identifies the operating system of the mobile device.

In further accord with an embodiment of the claimed invention, the identified information residing on the mobile device comprises any data stored on the memory of the mobile device.

Furthermore, according to some embodiments of the invention, selecting some or all the identified information to archive further comprises one or more user-selected preferences comprising a selectable hierarchy of available information for archiving.

In further accord with an embodiment of the claimed invention, the one or more user-selected preferences further comprise archiving options that, when selected by the user, archive the selected hierarchy of available information without further user input at a user-selected interval of time.

In further accord with yet another embodiment of the claimed invention, the some or all the identified information to archive further comprises any one or more of: (a) information that has been added since a previous archiving event at a preceding user-selected interval of time, and (b) information that has been modified since a previous archiving event at a preceding user-selected interval of time.

Furthermore, in accord with another embodiment of the claimed invention, the some or all the available information to archive further comprises all information stored on the mobile device.

The instructions for storing the selected information to the identified storage medium further comprise, according to embodiments of the invention, instructions for retrieving the selected information from the identified storage medium.

Restoring the data, as aforementioned albeit briefly, is accomplished according to embodiments of the claimed invention using a method for retrieving archived information from a medium external to a target mobile device of a user, the method comprising: (1) identifying, using a processing device, a storage medium external to the target mobile device on which information previously residing on a mobile device is archived; (2) identifying, using a processing device, the target mobile device to which archived information is restored; (3) identifying, using a processing device, information archived on the storage medium; (4) selecting some or all the archived information to restore to the target mobile device; and (5) retrieving the selected information and instructions for restoring the selected information to the target mobile device from the storage medium external to the target mobile device by transmitting the information and instructions.

In further accord with an embodiment of the claimed invention, restoring the data further comprises (a) executing the first computer-executable program code on the mobile device to restore the archived information from the storage medium to the mobile device in response to receiving user input; and (b) receiving a transmission comprising some or all the archived information.

Furthermore, according to yet another embodiment, restoring further comprises executing a second computer-executable program code configured to, when executed, restore the archived information from the storage medium to the target mobile device.

In accordance with an embodiment of the claimed invention, a first computer-executable program code recorded on the target mobile device is identical to the second computer-executable program code.

Furthermore, embodiments are provided comprising: executing the second computer-executable program code, using a host device, wherein the second program code, when executed, is configured to cause the host device to: (a) retrieve some or all the archived information from the identified storage medium; (b) identify the operating system of the target mobile device; (c) restore the archived information from the identified storage medium to the target mobile device; and (d) communicate to the user that archived information has been retrieved from the identified storage medium and restored to the target mobile device.

In accordance with yet another embodiment, the target mobile device is different from the mobile device from the mobile device from which the information is archived.

In yet another embodiment, the operating system of the target mobile device is different from the operating system of the mobile device from which the information is archived.

Furthermore, according to some embodiments, restoring the archived information further comprises restoring a plurality of information comprising any one or more of applications, programs, application data, digital photographs, music, movies, videos, user settings, user preferences.

In accordance with another embodiment of the claimed invention, executing the second computer-executable program code, using a host device, wherein the second program code causes the host device to communicate to the user that the archived information is available for retrieval.

In yet another embodiment, the second computer-executable program code is further configured to, when executed, configure the archived information for the operating system of the mobile device to which information is restored.

In yet another embodiment, identifying the storage medium external to the mobile device comprises communicating a request for user input indicating from which of a plurality of storage media external to the mobile device should retrieve the selected information.

Furthermore, according to some embodiments, identifying a storage medium external to the target mobile device on which information previously residing on a mobile device is archived comprises receiving user input indicating on which of a plurality of storage media external to the mobile device the identified information is archived.

According to yet other embodiments, identifying the storage medium external to the target mobile device on which information previously residing on a mobile device is archived comprises determining which one or more storage media external to the target mobile device for archiving information is operatively connected with the target mobile device and configured to transmit archived information.

In accordance with another embodiment of the claimed invention, identifying the storage medium external to the target mobile device on which information previously residing on a mobile device is archived comprises: (1) recognizing that one or more storage media have been operatively connected with the mobile device; and (2) determining that the one or more storage media for archiving information are capable of restoring the selected information to the target mobile device.

In accordance with another embodiment of the claimed invention, identifying the storage medium external to the target mobile device on which information previously residing on a mobile device is archived further comprises selecting one of the two or more storage media based at least in part on one or more media archiving preferences.

According to yet other embodiments, the one or more media archiving preferences comprise one or more user-selected preferences comprising a hierarchy of available storage media for retrieving archived information.

In accordance with an embodiment of the claimed invention, identifying the storage medium external to the target mobile device on which information previously residing on a mobile device is archived further comprises: (a) communicating a prompt to the user requesting a hierarchy of available storage media; and (b) receiving user input comprising the hierarchy of available storage media.

In accordance with yet another embodiment of the claimed invention, the storage medium external to the target mobile device on which information previously residing on a mobile device is archived comprises one or more of a smartphone, a telephone, a personal digital assistant, an SD card, a micro-SD card, a USB device, an external disk drive, an internal disk drive, one or more remote computers, one or more remote servers, one or more remote databases.

In accordance with yet other embodiments of the claimed invention, the media archiving preferences comprise a user-defined criterion for selecting the storage medium external to the mobile device for on which information previously residing on a mobile device is archived.

In still another embodiment, selecting some or all the archived information to restore to the target mobile device comprises communicating a request for user input indicating the portion of archived information residing on the storage medium external to the target mobile device should be selected to restore.

In yet another embodiment, some or all the archived information to restore to the target mobile device comprises receiving user input indicating the portion of archived information residing on the storage medium external to the target mobile device that is selected for restoring to the target mobile device.

In still another embodiment, selecting some or all the archived information to restore to the target mobile device comprises: (a) determining that some or all of the archived information does not reside on the target mobile device; and (b) selecting the some or all of the archived information that does not reside on the target mobile device.

BRIEF DESCRIPTION OF THE DRAWINGS

Figure 1:
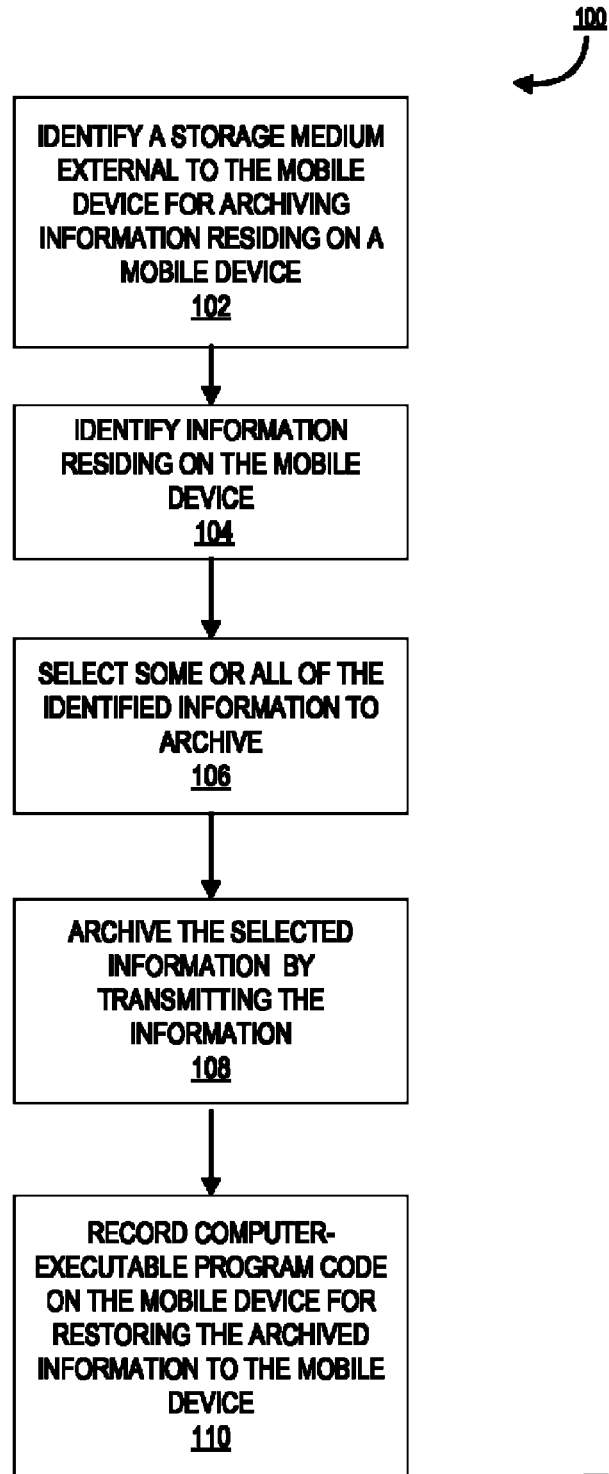
Figure 2:
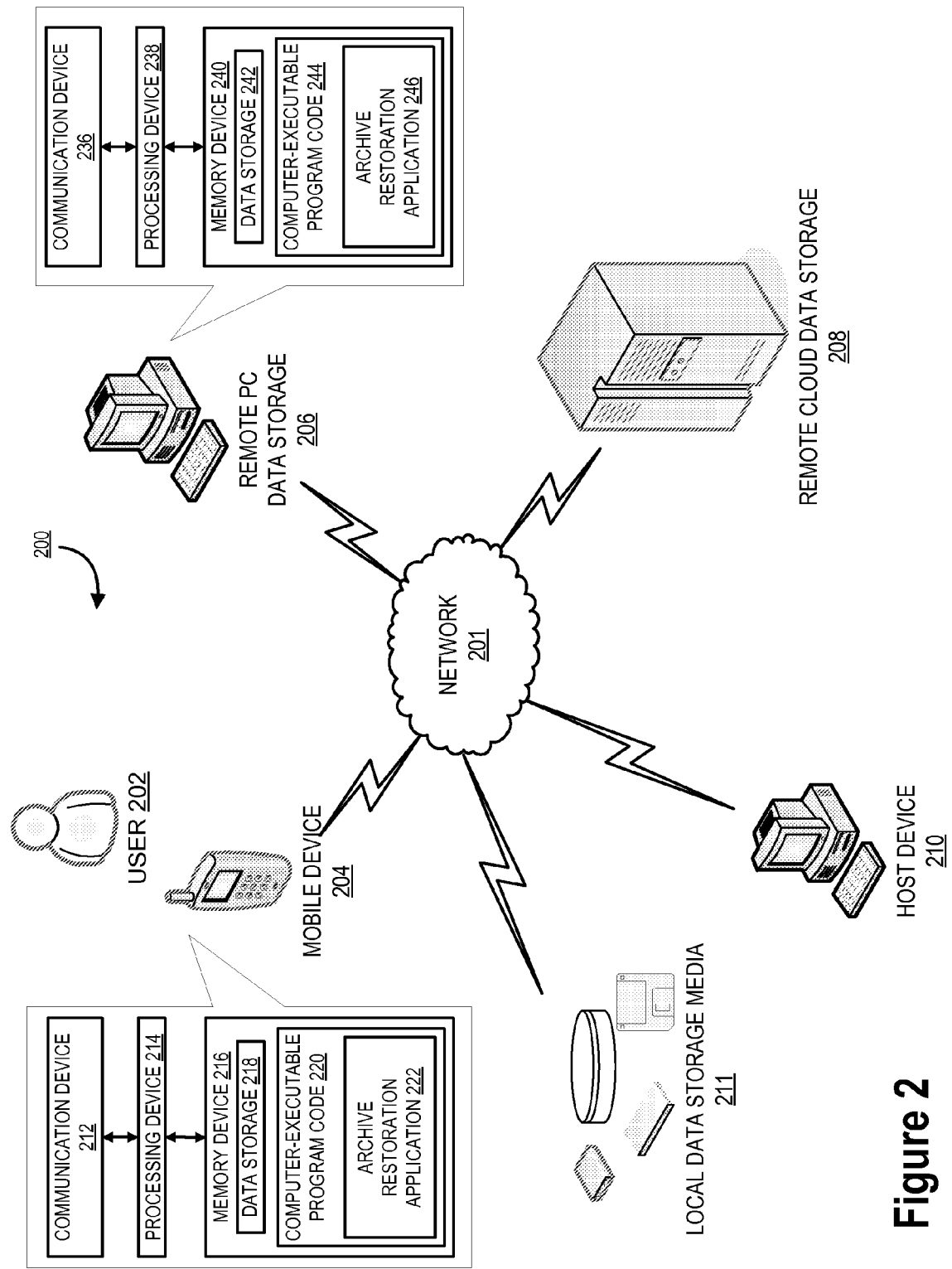
Figure 3:
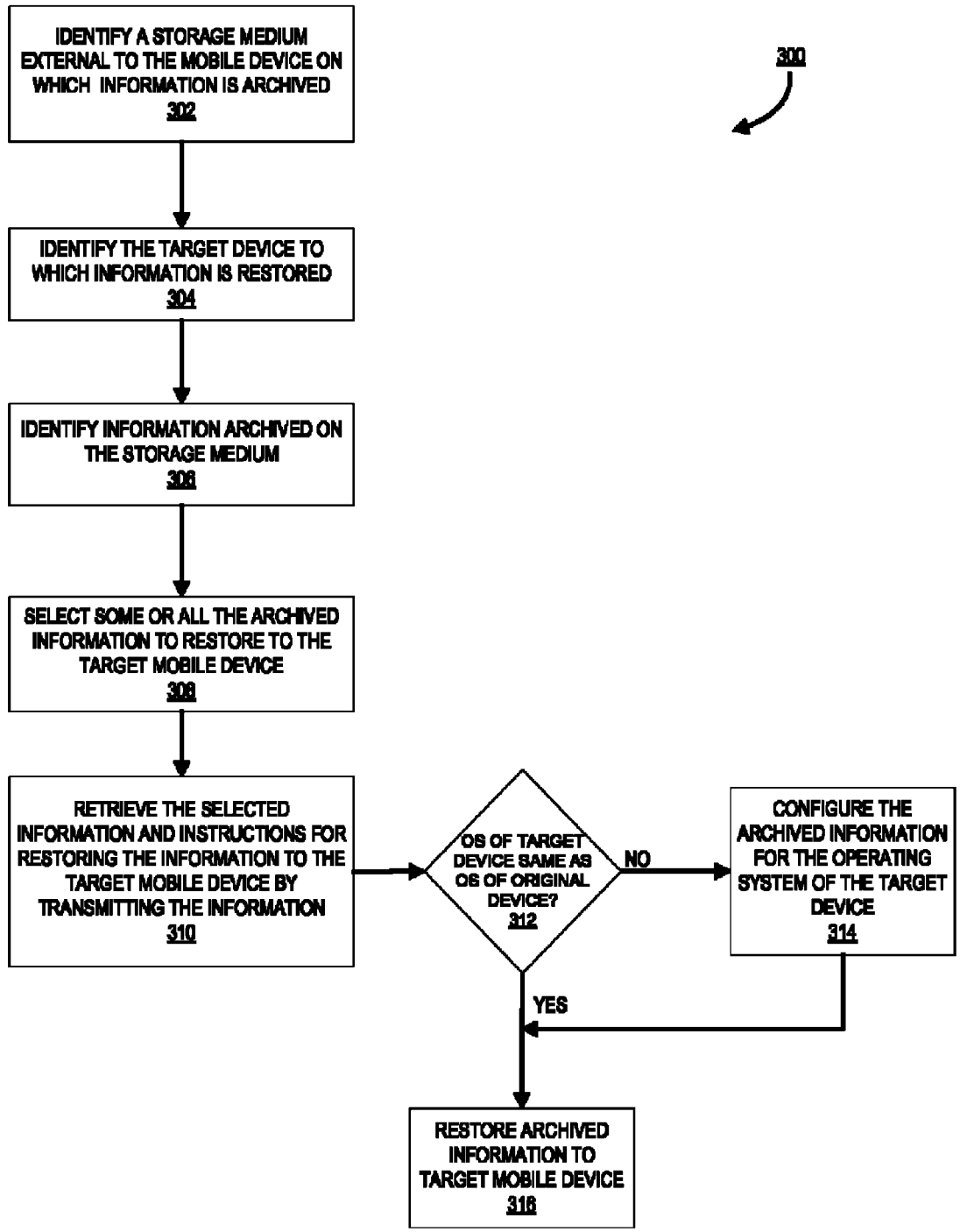
Figure 4:
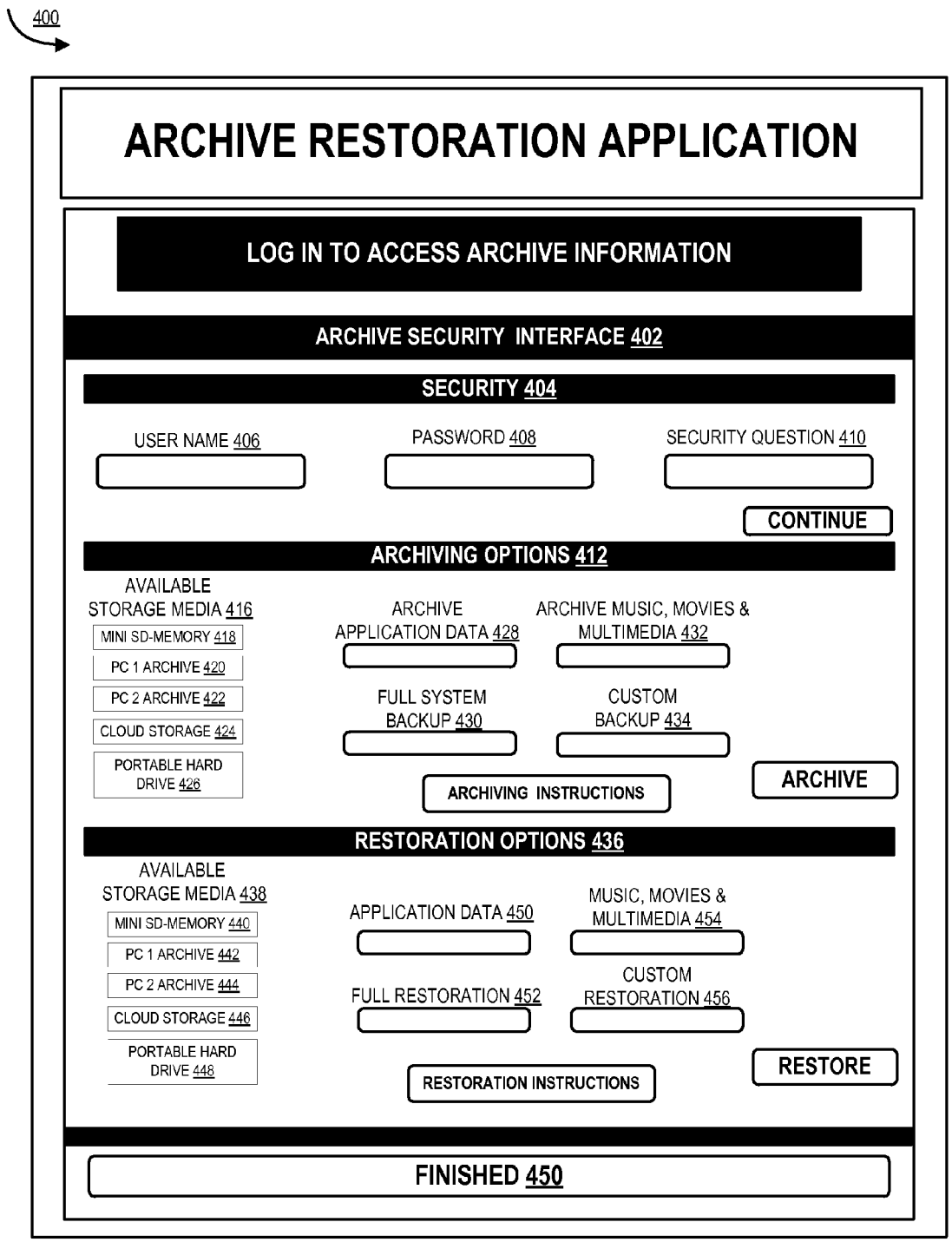

Having thus described embodiments of the invention in general terms, reference will now be made to the accompanying drawings, where:

FIG. 1 provides a high level process flow illustrating a mobile device information archiving process, in accordance with embodiments of the invention;

FIG. 2 provides a mobile device information archiving system environment, in accordance with embodiments of the invention;

FIG. 3 provides a mobile device information archive restoration process, in accordance with embodiments of the invention;

FIG. 4 provides a mobile device information archiving and restoration interface, in accordance with embodiments of the invention;

DETAILED DESCRIPTION OF EMBODIMENTS OF THE INVENTION

Embodiments of the claimed invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

As used herein, the term "data" shall mean information in a form suitable for use with a computer, comprising one or more computer-executable program code portions, executable and non-executable files, machine binary code, and/or any other digital information used on a mobile device. The term "information" is used herein as an interchangeable term for "data" when used in context of a computing or archiving process.

In some embodiments, information is said to be "archived," which will be understood to mean a non-transitory storage of electronic information residing on a mobile electronic device (i.e., data, computer programs, files, code, preferences, settings, and/or the like), on a non-transitory computer-readable medium that is external to the mobile electronic device. Archiving is known to those skilled in the art to be the process of "backing up," that is, making copies of data which may be used to restore the original after a data loss event. Information that is "backed up" is said to be archived, and vice versa. Information that is "restored" is copied from the archive media and written to the non-transitory memory of the mobile device or a replacement mobile device. Information (data) restoration will be understood to mean copying the data from the archive media to the target mobile device and configuring the data for use by mobile applications on the target mobile device. In some embodiments of the claimed invention described in more detail hereafter, configuring the information may include preparing the archived information for use in a dissimilar operating system environment than the operating system environment from which the information was archived.

Storage media includes, but is not limited to, non-volatile electronic memory such as computer hard disk memory (i.e. internal or external hard disk drive (HDD), etc.), solid state semiconductor memory (i.e. USB flash memory, solid state hard drives, memory cards, SD card, micro-SD card, etc.) magnetic memory (i.e. magnetic disk memory, magnetic tape memory, etc.), optical memory (i.e. compact disk (CD), writable compact disk (CD-R), re-writable compact disk (CD-RW), Blu-ray Disk®, digital video disk (DVD), high definition video disk (HD-DVD), holographic memory, 3D data storage, etc.) and/or any combination of the foregoing. Storage media may be physically connected to the mobile device or be operatively connected through a wired or wireless network connection (i.e. cloud storage, remote storage, one or more local and/or remote servers, etc.). Storage media may work independently or as a part of a computing system.

The present invention is generally characterized as a method and apparatus for archiving (e.g. saving or backing-up) and restoring (e.g. retrieving and/or re-writing to the target device) information that is stored on a mobile device, for example a mobile phone. The following description illustrates embodiments of the present invention in which data on the mobile device is selected and saved to one or more physical locations (either locally or on a network such as cloud storage or remote data archive(s)). Further, the following description illustrates embodiments where the archived information is restored from the one or more archives to the original device or a suitable replacement device.

Looking now at FIG. 1, an illustration is presented showing a high level process flow 100 for a mobile device data archiving system, which will be discussed in further detail throughout this specification with respect to FIGS. 2 through 4. Process Flow 100 illustrates an embodiment of the system where a mobile device, which contains data, is running a first computer-executable program code that allows the device to archive and retrieve data. The data located on the mobile device of Process Flow 100 is said to "reside" on the device. Process Flow 100 describes the archiving portion of the claimed invention in general terms. As shown in block 102, the first computer-executable code causes the mobile device to identify a storage medium external to the mobile device for archiving the information residing on the mobile device. As related in more detail in FIG. 2, a storage medium can include any of a plurality of storage media. Examples of a storage medium include, but are not limited to, a removable hard drive, SD RAM, a remote server, a local computer hard drive, another mobile device, cloud storage accessed using a network such as the internet, and/or the like.

Identifying a storage medium available for archiving, according to some embodiments, includes identifying any and all storage media that are operatively connected or otherwise accessible to the mobile device. "Accessibility" to a storage medium includes, at least, the ability of a mobile device, a host device, and/or computer-executable program code to transmit information to, and receive information from the storage medium. According to embodiments of the claimed invention, identifying the storage medium external to the mobile device may further include communicating a request for user input indicating which of a plurality of storage media external to the mobile device should receive the identified information for archiving.

According to some embodiments, two or more storage media external to the mobile device may be used for archiving information. As an example, according to one embodiment, the user selects an option after being prompted to use a cloud data storage account as the primary archiving location, and chooses a hard drive located on a local personal computer that is operatively connected to the mobile device by a wireless local area network (WLAN). Any number of available storage media external to the mobile device may be used for archiving, and is limited only by user selection and practicality. Accordingly a hierarchy of available storage media is created by the system of Process Flow 100, where any media currently or previously connected to the mobile device appears in the hierarchy. Connected and currently available media shows as especially highlighted, indicating that the media is active and available.

Some embodiments include user-selected media archiving preferences, where a user indicates the preferred archiving method. An example of a user preferred method for storage media selection is where the system of Process Flow 100, based on a user-selected preference, automatically chooses storage media based on the greatest available storage capacity among the two or more storage media that are available for archiving. Accordingly, media archiving preference can alternately or alternatively be user-selected based on an available data transfer rate, where the storage media with the greatest available data transfer rate among the two or more storage media is selected as the primary storage media. As an example, the system of Process Flow 100 identifies that the available storage media for archiving are a remote server available to the mobile device through an operative internet connection, and an external hard drive operatively connected to the mobile device through a micro-USB connection. The system of Process Flow 100 identifies that the internet connection provides a faster transfer rate than the micro-USB connection, and chooses the remote server as the primary medium for archiving based on the user-selected preference. Yet other embodiments provide for one or more user-selected preferences where a hierarchy of available storage media for archiving information is ordered by the user. According to yet other embodiments, a hierarchy of available storage media is manually input by a user, where the user is prompted to provide a hierarchy of available storage media, and the user responds by indicating which media is available.

As represented by block 104, information residing on the mobile device is identified by the system of Process Flow 100. Information identified includes but is in no way limited to electronic information such as: applications, code portions, application data, phonebooks, calendars, movies, videos, music, digital photographs, databases, spreadsheets, documents, settings, preferences, operating system data, and/or other digital information.

Some or all of the identified information is selected by the system of Process Flow 100 for archiving, as shown in block 106. Identified information available for archiving includes any data stored on the memory of the mobile device. The selection of identified information to archive further includes one or more user-selected preferences comprising a selectable hierarchy of available information for archiving. As an example, a user may select the preference of archiving all music, email, and contact entries; however the user may also select the preference to omit archiving movies residing on the memory of the mobile device. In accordance with the user-selected preferences, then, only music, email and contact entries residing on the user's mobile device are selected for archiving. The process of block 106 may also be accomplished by the default preferences of the system of Process Flow 100, where all information available for archiving is selected.

According to some embodiments of the claimed invention, some or all of the identified information to archive may be selected because the data that has been changed or added since the previous archiving event at a preceding user-selected interval of time. As an example, the user-selected interval of time for archiving may be 24 hours, where the system of Process Flow 100 identifies any information on the mobile device that has been modified or added within the previous 24 hours, and archives only the added and/or modified information.

Yet other embodiments of the claimed invention some or all of identified information to archive may include both user accessible data, and data that is not user accessible. Examples of user accessible data may include information such as, but not limited to: transaction history, preferences and settings, program data and/or abovementioned data such as music, email, etc. User accessible data can be accessed by the user, selected, modified, and/or purposefully executed by selection.

Additionally or alternatively, information to archive that is not user accessible may include, but is not limited to secured elements (data) on the mobile device such as: payment account credentials, financial institution settings and/or credentials, electronic coupons, offers, transit cards, security keys, house keys, mobile wallet items, mobile wallet settings, mobile wallet preferences, miscellaneous security credentials and/or the like. Of course, while the information that is not user accessible is generally not, by definition, directly user accessible by selecting, viewing, or otherwise manipulating, the information may be archived by selecting a general category of selected information to archive, such as by a user-selectable preference setting such as "Archive Secured Elements," and/or the like.

Block 108 represents archiving the selected information by transmitting the selected information from the mobile device to the one or more storage media. Transmission is made through either wired or wireless connection, or a combination of the foregoing. Yet other embodiments perform a transmission of all information stored on the mobile device 108 at each archiving event. Such an embodiment of the claimed invention selects and transmits the complete memory contents of the mobile device, which includes all the information stored on the mobile device including operating system information.

The primary objective of the claimed invention is the safeguarding of information residing on a mobile device, for the purpose of restoring the information to the mobile device after a data loss event. As represented in Block 110 of FIG. 1, a computer executable program code is recorded on the mobile device for restoring the archived information back to the mobile device. According to embodiments of the claimed invention, the system of Process Flow 100 writes a computer-executable code to the mobile device at each archiving event that, when executed, restores information from the storage media to the mobile device. The code is executed by the user, which activates a series of automated steps and user prompts that result in a complete restoration of the damaged, lost and/or missing information to the mobile device. A complete restoration includes secured information such as personal files and data, and non-secured information, such as downloadable mobile application code. Some embodiments of the claimed invention provide a written list of steps for the user to perform to restore mobile applications to the mobile device that may be lost or damaged, and were not selected for archiving. For example, to limit the volume of transmitted data at each archiving event, a user sets the preference that all application data be selected for archiving, however the non-secured information (i.e. the applications themselves) are not selected for archiving. In different terms, the user archives only the unique, irreplaceable information (the secured data) for archiving such as settings, preferences, user files, etc., while omitting the application which can be easily replaced by re-downloading from the application provider (the non-secured data).

In the event of partial or total mobile device failure, the system of Process Flow 100 identifies that the mobile applications require restoration, and in addition to restoring the archived information, creates a numbered "to do list" for the user to perform to restore the phone to a previous condition. Accordingly, the system of Process Flow 100 records and transmits a similar or identical computer-executable code as part of the information selected for archiving 108. In the event of a complete device failure, or loss of the device, the aforementioned code is accessible using a host device such as a personal computer or another mobile device, and can be transferred to a replacement mobile device and executed to perform the same task.

Some or all associated financial institution data on a mobile device such as a mobile wallet credentials, for example, may be affected by a data restoration event. According to embodiments disclosed, in the event of a data restoration event, the system of Process Flow 100 may notify a financial institution associated with financial accounts accessed by the mobile device that a mobile device has had a data restoration and/or other modification affecting secured financial institution credentials. Accordingly, the financial institution will update one or more host systems external to the mobile device to reflect the new device credentials, secured data elements, etc. Some embodiments may include automated notification of a data restoration to a financial institution of the hardware and/or account changes, or may include a notification to the mobile device user to notify a financial institution of the hardware and/or account changes. In yet other embodiments, one or more elements of the numbered "to do list" may include a request to contact the financial institution technical support department or other financial institution representative.

Looking now at FIG. 2, an embodiment will be described that demonstrates one possible system for mobile device data archiving. In general, the system 200 embodies multiple media on which a mobile device may be configured to communicate, transmit and ultimately accomplish the general intent of the claimed invention. According to the shown embodiment of system 200, a mobile device may have access to one, two or more media at any given time. In most real-life scenarios, it is not practical or possible to connect to each medium at every archiving event. One possible reason for connecting to more than one media archive at an archiving event is for redundant data storage, which decreases the likelihood of data loss. Normally, however, a single media storage source is selected based on to user-preference.

FIG. 2 generally provides an environment in which a mobile device data archiving system 200 operates, in accordance with one embodiment of the claimed invention. As illustrated in FIG. 2, the mobile device 204 is operatively coupled, via a network 201 to the local data storage media 211, to a host device 210, to a remote "cloud" data storage system 208, and to a remote personal computer used as data storage 206. In this way, the mobile device 204 can transmit information to any of the operatively connected storage media. FIG. 2 illustrates only one example of an embodiment of a mobile device data archiving system 200, and it will be appreciated that in other embodiments one or more of the systems, devices, or servers may be combined into a single system, device, or server, or be made up of multiple systems, devices, or servers. For example. The local data storage media 211 may be any one or more of an external hard drive, disk, chip, card and/or the like. Any of the media shown (210, 211, 206 & 208) may operate independently or as part of a computing system. Of course, there may be any number of available storage media operatively connected to a mobile device 204, and there may be any number of mobile devices 204 in the system 200.

The network 201 may be a global area network (GAN), such as the Internet, a wide area network (WAN), a local area network (LAN), or any other type of network or combination of networks. The network 201 may include one or more separate networks. The network 201 may include one or more payment networks (e.g., interbank networks, Visa's® payment network VisaNet®, MasterCard's® payment network BankNet®, any wireline and/or wireless network over which payment information is sent, etc.), telephone networks (e.g., cellular networks, CDMA networks, any wireline and/or wireless network over which communications to telephones and/or mobile phones are sent, etc.), local area networks (LANs), wide area networks (WANs), global area networks (GANs) (e.g., the Internet, etc.), and/or one or more other telecommunications networks. For example, in some embodiments, the network 201 includes a telephone network (e.g., for communicating with the mobile device 204, and a payment network. It will also be understood that the network 201 may be secure and/or unsecure and may also include wireless and/or wireline technology.

In some embodiments, the mobile device 204, the host device 210, the local data storage media 211 and remote personal computer data storage 206 are each owned and maintained by the user 202. In other embodiments, the mobile device 204 is owned and maintained by the user 202, and some or all of the aforementioned storage media are owned and/or maintained by separate entities. For example, in some embodiments, the remote cloud data storage 208 is or includes a remote server or network of servers operatively connected to one another via a network. The cloud data storage is normally owned and maintained by an entity separate from the user 202, however may be fully accessible by the user using the user's mobile device 204 or some other means such as a host device 210. In accordance with some embodiments, the mobile device 204 is associated with the user 204 and/or is carried, possessed, and/or owned by the user 202. In yet other embodiments, each of the devices of system 200 are owned and maintained by a separate entity such as a financial institution or other business entity.

The mobile device 204 generally includes a communication device 212, a processing device 214, and a memory device 216. The mobile device 204 may be, for example, a handheld personal computer, a tablet computer, a cellular phone, smart phone, personal data assistant (PDA), laptop, and/or the like. Although only a single mobile device 204 is depicted in FIG. 2, the mobile device data archiving system 200 may contain numerous mobile devices 204. The mobile device 204 is essentially a mobile computing system that allows a user to perform a plurality of computing tasks, and is in many embodiments, similar in function to a personal computer. The mobile device 204 connects to a plurality of storage media via a network 201. The processing device 214 is operatively coupled to the communication device 212 and the memory device 216. The processing device 214 uses the communication device 212 to communicate with the network 201 and other devices on the network 201. As such, the communication device 212 generally includes a modem, wireless transmitter, or other device for communicating with other devices on the network 201.

As further illustrated in FIG. 2, the mobile device 204 may include computer-executable program code 220 stored in the memory device 216, which in one embodiment includes the computer-executable program code 220 containing, as a module, an archive restoration application 222. In this way, a user 202 may be able to select archiving and restoration preferences, archive information and restore information to the mobile device using the archive restoration application 222.

The mobile device 204, the remote personal computer data storage 206 is represented as a remote medium for archiving information residing on a mobile device 204. The remote PC data storage 206 contains within the memory device 240 computer-executable program code 244 containing, as a module, an archive restoration application 222. The computer executable code 244, according to some embodiments, is identical to the code stored on the mobile device 220. The redundant storage of the computer-executable program code (220 and 244) is provided so that the restoration instructions specific to a particular mobile device can be recovered and executed in the event of a catastrophic data loss event such as the device being lost or destroyed. In such an event, the computer executable program code 244 can be accessed using a host device 210 or a replacement mobile device 204 and executed either remotely across the network 201, or manually copied from the remote PC 206 to the mobile device 204, and executed locally on the mobile device 204. Similar to the mobile device 204, the remote PC data storage 206 generally includes a communication device 236, a processing device 238, and a memory device 240.

The host device 210, embodied as a personal computer, can be any of a number of computing platforms that allow access to network devices such as storage media 211 and/or mobile device 204. The host device 210 of system 200 provides a means to copy the computer executable program code 244 from a remote data storage 206 (or other storage media such as remote cloud data storage 208) to the target mobile device 204.

According to some embodiments described herein, the remote cloud data storage 208 depicts a model of networked online storage where data is stored on multiple virtual servers rather than being hosted on dedicated servers. In some instances, a hosting company operates large data centers. Those entities requiring that data be hosted may buy or lease storage capacity from the hosting company and use the cloud data storage service for a plurality of data storage needs. The data center operators, in the background, virtualize (i.e., make the resource appear to the mobile device as if the resource were part of the device) the resources according to the requirements of the cloud data storage user 202. The user 202 uses the remote cloud data storage 208 to store files, information, and/or data. Physically, the resource may span across multiple servers, or may be physically located on a single remote server. Cloud storage services may be accessed through a web service application programming interface (API), or through a Web-based user interface accessible through the mobile device 204, a host device 210 or another computing platform operating across the network 201 and capable of executing the interface.

FIG. 3 is a process flow diagram describing one embodiment of a mobile device data archive restoration process. In general, the purpose of the claimed invention is to provide a means for periodically saving data resident on a mobile device to a media archive for safe keeping in the event of data loss on the mobile device. FIG. 3 describes one embodiment of retrieving (and restoring) the information back to a "target" mobile device (the device on which the data will be restored). In some embodiments, the target mobile device is the device from which the data was archived. In yet other embodiments, the target mobile device is a replacement mobile device, or some other mobile device on which the restored data is required. The Process Flow 300 describes an embodiment where the operating system of the target mobile device is the same as the operating system of the original device from which the information was archived. Additionally, a restoration scenario is embodied in Process Flow 300 where the operating system of the target mobile device is dissimilar from the operating system of the original device. As an example of such an embodiment, a user archives data from an IPhone® and backs up the archived data to a smartphone running the Android operating system.

Referring now to block 302 of FIG. 3, the system of Process Flow 300 identifies a storage medium external to the mobile device on which information is archived. According to some embodiments, the storage medium is identified automatically by the system of Process Flow 300. In yet other embodiments, the storage medium on which information is archived is identified by receiving input in response to a user prompt by the system. A prompt is communicated to the user requesting a hierarchy of available storage media. A user then supplies input comprising the hierarchy of available storage media.

Additionally, according to some embodiments, identification of one or more storage media external to the target mobile device 302 may also include determining which one or more of a plurality of known media are operatively connected to the target mobile device and are configured to transmit the archived information. First, the system of Process Flow 300 recognizes that one or more storage media have been operatively connected with the mobile device. The system then tests the stability and speed of the wired or wireless network connection in preparation for data transmission.

Block 304 represents the step of identifying the target device to which information is restored. As part of the determination, the system of Process Flow 300 also determines the operating system of the target mobile device. A determination is then made by the system 306 that the one or more storage media for archiving information are capable of restoring the selected information to the mobile device. Determining the capability of restoring, according to some embodiments, may include testing the integrity and completeness of the data to be restored, determining the operating system of the device from which the archive data was transmitted, determining if the system of Process Flow 300 is capable of configuring the data for the operating system of the target mobile device, and identifying which portion of the archive data is capable of being transmitted. Accordingly, some or all of the archived information to restore to the target mobile device is selected.

The program code causes the host device, according to an embodiment of the invention, to communicate to the user that the archived information is available for retrieval. The communication contains, according to one embodiment, information describing the archived data available for retrieval including any one or more of the following: data type, archive date of the data, location of the data on the archive, device from which the data was archived, information that compares the archived data to the same and/or similar data residing on the mobile device as a means for comparison (i.e. the data is "up to date" on the mobile device), connection speed between the data archive and the target mobile device, and the like.

The communication to the user that the archived information is available for retrieval is delivered to the user in a number of ways, according to embodiments of the invention. For example, the communication is delivered by a dialogue box shown to the user on the mobile device, in some embodiments. In yet other embodiments, an email is sent to the user. In yet other embodiments, an SMS text message is sent to the target mobile device or a host device configured by the user to work with the archive system of Process Flow 300. Similarly, according to embodiments of the claimed invention, the system 300 is configured to deliver to the user a message indicating that the information has been restored from the archive to the target mobile device at the appropriate time.

In accordance with some embodiments, the system of Process Flow 300 selects some or all the archived information to restore to the target mobile device by determining that some or all of the archived information does not reside on the target mobile device, and selecting the archived information that resides on the archive medium but not on target mobile device. In general terms, the system identifies which information is on the media that is not on the target mobile device, and selects that missing information for transmission 308 to the mobile device.

The selected information and the instructions for restoring the information to the target mobile device are transmitted to the mobile device. The device is said to be "retrieved," that is, the transmission is initiated by the system of Process Flow 300, and the information is transmitted across the network to the target mobile device 310. A portion of the information selected and transmitted to the target mobile device is information identifying the operating system of the device from which the data is archived. Block 312 depicts the system decision in which the operating system of the target device is compared with the operating system associated with the archived information. If the operating system is the same, the information is restored to the target mobile device 316. If the operating systems are not the same, the information is configured for use by the new operating system 314, at which point the archived information is then restored to the target mobile device.

Block 314 refers to the configuration of data to be received by a dissimilar operating system from the operating system of the original device. The system of Process Flow 300 is equipped to compare root directories of both operating systems and configure the restored data to the usable directory locations of the target device operating system. In cases where file extensions and file metadata requires modification, the system configures the archived information by making the required data modifications. The configured information is then restored to the target mobile device 316.

As illustrated in FIG. 4, an interface archive restoration application is provided in accordance with one embodiment of the claimed invention, which allows a user to archive information and restore information using the interface. The security interface 402 provides a user name 406 entry and password entry 408 for secure access to stored archive information. User preferences are set at the initial use of the archive restoration application, where the user sets the username, password and security question 410. The security question works by providing the user a means to access a forgotten password by supplying a security question written by the user. The security question is presumably unanswerable by a person other than the user. The encrypted security preferences are stored with the archive information on any remote or local storage media, and on the mobile device. Access to archived data, therefore, is available from either the original mobile device or from a host device 210 as described in FIG. 2. The interface is generally divided into two main areas for operating the system of the claimed invention. The archiving options 412 and the restoration options 436.

After initiating the restoration application and providing security credentials 402, a user sees both archiving 412 and restoration options 436 available for selection options. The archiving options show available storage media 416 as selectable buttons, where each button appears as the particular medium is either currently detected or known to be associated with the device in the past. Each of the selectable buttons is highlighted as the user selects each medium for archiving. According to some embodiments, the medium selection buttons toggle on and off as each button is respectively selected and unselected. When more than one medium is selected, each selected medium receives the archiving transmission. Accordingly, embodiments of the invention allow for redundant copies of archive data to be made at each archiving event.

"Archive Application Data" 428, and "Archive Music, Movies & Multimedia" 432 are single-click archiving options that allow a user to select a single button and initiate an archiving event. For example, if the user wishes to archive application data, the same-named button is selected by the user, and an archiving event is initiated that archives application data only. "Full System Backup" 430 initiates a full archiving event in a similar manner as 428 & 432 by providing a backup of all contents of memory on the mobile device. Any future scheduled archiving events remain unaffected by any of the single button initiated archiving events.

"Custom Backup" 434 is user-selected to access custom archiving properties. Custom archiving properties includes individual application of archiving options to each medium. For example, a user wishes to archive only the music movies and multimedia stored on the mobile device as a full backup at the first archiving event, and then archive only new (added) music, movies and multimedia during the following archiving events. At the same time, the user wishes to schedule a full backup of all application data. The user may set both custom archiving properties by selecting "Custom Backup" 434.

The "Archiving Instructions" button and "Restoration Instructions" button initiate the readable text files that are included as part of the archive restoration application 400 for each respective topic. The text files are "help" files containing a full set of instructions for archiving and backing up information on the mobile device.

"Restoration Options" 436 function, according to embodiments of the claimed invention, as the identical reverse of "Archiving Options" 412. That is, each of the single-click buttons "Application Data" 450, "Music, Movies & Multimedia" 454 and "Full Restoration" 452 initiate respective restoration events identical to the "Archive Options" 428, 432 and 430, but in reverse by retrieving data from the selected archive media 438, processing the data (see FIG. 3, block 314) and saving the processed data to the functional locations on the mobile device file/data directory. "Custom Restoration" 456 initiates custom properties for user selection for restoring the data in reverse of the custom backup 434 of archiving options 434. The "Finished" button closes the archive restoration application 400.

As used herein, the term "processing device" generally includes circuitry used for implementing the communication and/or logic functions of the particular system. For example, a processing device may include a digital signal processing device device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-executable program code thereof, which may be stored in a memory device.

As will be appreciated by one of ordinary skill in the art, the claimed invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the claimed invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the claimed invention may take the form of a computer program product that includes a computer-readable storage medium having computer-executable program code portions stored therein. As used herein, a processing device may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the claimed invention, however, the computer-readable medium may be transitory, such as a propagation signal including computer-executable program code portions embodied therein.

It will also be understood that one or more computer-executable program code portions for carrying out operations of the claimed invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the claimed invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the claimed invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processing device of a general purpose computer, special purpose computer, and/or some other programmable data processing apparatus in order to produce a particular machine, such that the one or more computer-executable program code portions, which execute via the processing device of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the claimed invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for archiving information residing on a mobile device of a user, the method comprising:
    identifying, using a processing device, one or more storage mediums external to the mobile device for archiving information residing on the mobile device;
    presenting, via a user interface of the mobile device, the one or more storage mediums external to the mobile device;
    receiving a selection, from the user, of at least one of the one or more storage mediums external to the mobile device;
    identifying, using a processing device, information residing on the mobile device, wherein identifying information residing on the mobile device comprises identifying information that identifies the operating system of the mobile device;
    receiving a selection, from the user, of some or all of the identified information to archive to the user-selected one or more storage mediums external to the mobile device, wherein the identified information to archive comprises information that identifies the operating system of the mobile device;
    in response to receiving the selection of the identified information to archive, automatically generating by a processing device of the mobile device both:
        a first computer-executable program code comprising instructions for remotely restoring the user-selected identified information from the user-selected one or more storage mediums external to the mobile device to any remote computing device of the user, and
        a second computer-executable program code comprising instructions for restoring the user-selected identified information from the user-selected one or more storage mediums external to the mobile device back onto a memory of the mobile device;

transmitting the first computer-executable program comprising instructions for restoring to the user-selected one or more storage mediums external to the mobile device;

storing both:
the first computer-executable program code onto each of the user-selected one or more storage mediums external to the mobile device, and
the user-selected identified information to archive onto the user-selected one or more storage mediums external to the mobile device;

storing the second computer-executable program code onto the memory of the mobile device.

2. The method of claim 1, further comprising:
executing the program code on the mobile device to restore the archived information from the storage medium to the mobile device in response to receiving user input; and
receiving a transmission comprising some or all the archived information.

3. The method of claim 2, wherein restoring the archived information from the storage medium further comprises restoring information comprising one or more of one or more applications, one or more programs, application data, music, movies, videos, user settings, or user preferences.

4. The method of claim 3, wherein the first computer-executable program code is identical to the second computer-executable program code.

5. The method of claim 1 further comprising:
archiving, on a storage medium, second computer-executable program code configured to, when executed, restore the archived information from the storage medium to the mobile device.

6. The method of claim 1, wherein identifying the storage medium external to the mobile device comprises communicating a request for user input indicating which of a plurality of storage media external to the mobile device should receive the identified information for archiving.

7. The method of claim 1, wherein identifying the storage medium external to the mobile device comprises receiving user input indicating which of a plurality of storage media external to the mobile device should receive the identified information for archiving.

8. The method of claim 1, wherein identifying the storage medium external to the mobile device for archiving information comprises determining two or more storage media external to the mobile device for archiving information, the two or more storage media capable of being operatively connected with the mobile device and configured to receive information for archiving.

9. The method of claim 8, wherein identifying the storage medium external to the mobile device for archiving information further comprises selecting one of the two or more storage media based at least in part on one or more media archiving preferences.

10. The method of claim 9, wherein the one or more media archiving preferences comprise one or more user-selected preferences comprising a hierarchy of available storage media for archiving information.

11. The method of claim 8, wherein identifying the storage medium external to the mobile device for archiving information further comprises:
communicating a prompt to the user requesting a hierarchy of available storage media; and
receiving user input comprising the hierarchy of available storage media.

12. The method of claim 9, wherein the media archiving preferences comprise a user-defined criteria for selecting the storage medium external to the mobile device for archiving information.

13. The method of claim 9, wherein the media archiving preferences comprise an available capacity preference indicating that the storage media should be selected based on the greatest available storage capacity among the two or more storage media.

14. The method of claim 9, wherein the media archiving preferences comprise an available data transfer rate preference indicating that the storage media should be selected based on the greatest available data transfer rate among the two or more storage media.

15. The method of claim 1, wherein identifying the storage medium external to the mobile device for archiving information comprises determining one or more storage media external to the mobile device for archiving information, the one or more storage media capable of being operatively connected with the mobile device and configured to receive information for archiving.

16. The method of claim 1, wherein identifying the storage medium external to the mobile device for archiving information comprises recognizing that one or more storage media have been operatively connected with the mobile device and determining that the one or more storage media for archiving information are capable of receiving information for archiving.

17. The method of claim 1, wherein the storage medium external to the mobile device comprises one or more of a smartphone, a telephone, a personal digital assistant, an secure digital (SD) card, a micro-secure digital (SD) card, an universal serial bus (USB) device, an external disk drive, an internal disk drive, one or more remote computers, one or more remote servers, or one or more remote databases.

18. The method of claim 1, wherein the identified information residing on the mobile device comprises any data stored on the memory of the mobile device.

19. The method of claim 1, wherein selecting some or all the identified information to archive further comprises one or more user-selected preferences comprising a selectable hierarchy of available information for archiving.

20. The method of claim 19, wherein the one or more user-selected preferences comprise archiving options that, when selected by the user, archive the selected hierarchy of available information without further user input at a user-selected interval of time.

21. The method of claim 20, wherein some or all the identified information to archive comprises one or more of:
information that has been added since a previous archiving event at a preceding user-selected interval of time, or
information that has been modified since a previous archiving event at a preceding user-selected interval of time.

22. The method of claim 19, wherein some or all the available information to archive comprises substantially all information stored on the mobile device.

23. The method of claim 1, wherein the instructions for storing the selected information to the identified storage medium further comprise instructions for retrieving the selected information from the identified storage medium.

24. A method for retrieving archived information from a medium external to a target mobile device of a user, the method comprising:
executing a first computer-executable program code in response to receiving user input, wherein the first computer-executable program code is generated based at least partially on an historical occurrence of an archiving event involving a mobile device of the user and a user-selected storage medium that is external to the mobile device, and wherein the first computer-executable program code comprises instructions for remotely restoring onto a target mobile device the user-selected information from the user-selected storage medium, wherein the user-selected information comprises identifying information that identifies an operating system of the mobile device, and wherein the first computer-executable program code, when executed, causes one or more processing devices to:

identify the user-selected storage medium external to the target mobile device on which user-selected information previously residing on the mobile device of the user is archived;

identify the target mobile device to which archived user-selected information is to be restored;

identify an operating system associated with the target mobile device based on the user-selected information;

identify user-selected information archived on the user-selected storage medium;

identify an operating system associated with the information archived on the user-selected storage medium;

compare the operating system associated with the target mobile device to the operating system associated with the information archived on the user-selected storage medium;

configure the information archived on the user-selected storage medium to the operating system associated with the target mobile device when it is determined based at least partially on the comparison that the operating system associated with the target mobile device is different from the operating system associated with the user-selected storage medium;

receive a selection of some or all of the archived user-selected information to restore to the target mobile device; and transmit to the target mobile device from the user-selected storage medium external to the target mobile device the user-selected information and first computer-executable program code comprising instructions for restoring the user-selected information to the target mobile device.

25. The method of claim 24, further comprising:
receiving a transmission comprising some or all the archived information.

26. The method of claim 24 further comprising:
executing a second computer-executable program code configured to, when executed, restore the archived information from the storage medium to the target mobile device.

27. The method of claim 26, wherein a first computer-executable program code recorded on the target mobile device is identical to the second computer-executable program code.

28. The method of claim 26, wherein restoring the archived information further comprises restoring a plurality of information comprising one or more of one or more applications, one or more programs, application data, digital photographs, music, movies, videos, user settings, or user preferences.

29. The method of claim 26, further comprising:
executing the second computer-executable program code using a host device, wherein the second program code causes the host device to communicate to the user that the archived information is available for retrieval.

30. The method of claim 26, further comprising:
executing the second computer-executable program code using a host device, wherein the second program code, when executed, is configured to cause the host device to:
retrieve some or all the archived information from the identified storage medium;
identify the operating system of the target mobile device;
restore the archived information from the identified storage medium to the target mobile device; and
communicate to the user that archived information has been retrieved from the identified storage medium and restored to the target mobile device.

31. The method of claim 30, wherein the target mobile device is different from the mobile device from which the information is archived.

32. The method of claim 30, wherein the operating system of the target mobile device is different from the operating system of the mobile device from which the information is archived.

33. The method of claim 26, wherein the second computer-executable program code is further configured to, when executed, configure the archived information for the operating system of the mobile device to which information is restored.

34. The method of claim 24, wherein identifying the storage medium external to the mobile device comprises communicating a request for user input indicating from which of a plurality of storage media external to the mobile device the selected information should be retrieved.

35. The method of claim 24, wherein identifying a storage medium external to the target mobile device on which information previously residing on the mobile device is archived comprises receiving user input indicating on which of a plurality of storage media external to the mobile device the identified information is archived.

36. The method of claim 35, wherein identifying the storage medium external to the target mobile device on which information previously residing on the mobile device is archived further comprises selecting one of the two or more storage media based at least in part on one or more media archiving preferences.

37. The method of claim 36, wherein the one or more media archiving preferences comprise one or more user-selected preferences comprising a hierarchy of available storage media for retrieving archived information.

38. The method of claim 37, wherein identifying the storage medium external to the target mobile device on which information previously residing on the mobile device is archived further comprises:
communicating a prompt to the user requesting a hierarchy of available storage media; and
receiving user input comprising the hierarchy of available storage media.

39. The method of claim 36, wherein the media archiving preferences comprise a user-defined criteria for selecting the storage medium external to the mobile device on which information previously residing on the mobile device is archived.

40. The method of claim 24, wherein identifying the storage medium external to the target mobile device on which information previously residing on the mobile device is archived comprises determining which one or more storage media external to the target mobile device for archiving information is operatively connected with the target mobile device and configured to transmit archived information.

41. The method of claim 24, wherein identifying the storage medium external to the target mobile device on which information previously residing on the mobile device is archived comprises:

recognizing that one or more storage media have been operatively connected with the mobile device; and determining that the one or more storage media for archiving information are capable of restoring the selected information to the target mobile device.

42. The method of claim 24, wherein the storage medium external to the target mobile device on which information previously residing on the mobile device is archived comprises one or more of a smartphone, a telephone, a personal digital assistant, an secure digital (SD) card, a micro-secure digital (SD) card, an universal serial bus (USB) device, an external disk drive, an internal disk drive, one or more remote computers, one or more remote servers, or one or more remote databases.

43. The method of claim 24, wherein selecting some or all the archived information to restore to the target mobile device comprises communicating a request for user input indicating the portion of archived information residing on the storage medium external to the target mobile device should be selected to restore.

44. The method of claim 24, wherein selecting some or all the archived information to restore to the target mobile device comprises receiving user input indicating the portion of archived information residing on the storage medium external to the target mobile device that is selected for restoring to the target mobile device.

45. The method of claim 24, wherein selecting some or all the archived information to restore to the target mobile device comprises:

determining that some or all of the archived information does not reside on the target mobile device; and selecting some or all of the archived information that does not reside on the target mobile device.

* * * * *